United States Patent
Acquah

(10) Patent No.: US 8,544,916 B2
(45) Date of Patent: Oct. 1, 2013

(54) CABLE PLACEMENT AND RETRIEVAL DEVICE

(75) Inventor: Eric Acquah, Orlando, FL (US)

(73) Assignee: Acquah's Enterprise, Inc., Maryland, FL (US)

( * ) Notice: Subject to any disclaimer, the term of this patent is extended or adjusted under 35 U.S.C. 154(b) by 0 days.

(21) Appl. No.: 13/236,268

(22) Filed: Sep. 19, 2011

(65) Prior Publication Data

US 2013/0071190 A1 Mar. 21, 2013

(51) Int. Cl.
*B66F 19/00* (2006.01)

(52) U.S. Cl.
USPC .... 294/175; 294/209; 114/221 R; 114/230.25

(58) Field of Classification Search
USPC ............ 294/174, 26, 175, 209; 254/134.3 R, 254/134.3 PA, 134.4 FT; 81/53.1; 7/161, 7/169; 114/221 R, 230.15, 230.25
See application file for complete search history.

(56) References Cited

U.S. PATENT DOCUMENTS

| 731,145 | A | * | 6/1903 | Wilbur | 294/174 |
| 2,484,278 | A | * | 10/1949 | Fisher | 140/93 R |
| 3,072,428 | A | * | 1/1963 | Johnson | 294/2 |
| 3,433,521 | A | * | 3/1969 | Lasko | 294/92 |
| 3,936,088 | A | * | 2/1976 | Williams | 294/175 |
| D348,186 | S | * | 6/1994 | Wahl | D8/14 |

* cited by examiner

*Primary Examiner* — Stephen Vu
(74) *Attorney, Agent, or Firm* — Daniel Law Offices, P.A.; Jason T. Daniel, Esq.

(57) ABSTRACT

A cable placement and retrieval device includes a main shaft forming a hook opening defined by a generally inverted U-shaped bend terminating at a spherical bead, a rigid push rod radiating up and away from the main shaft in the opposite direction of the hook opening and terminating in a second spherical bead and a hollow proximal portion meant to receive extension arms and other complementary attachments.

14 Claims, 5 Drawing Sheets

CABLE PLACEMENT AND RETRIEVAL DEVICE

BACKGROUND

Field of the Invention

The present invention relates generally to line handling devices, and more particularly to a cable placement and retrieval device for installing and positioning cables in a marine environment.

Marine construction often involves the task of installing, moving or retrieving industrial materials such as cables, nets, ropes and wires, for example. In the past, workers have used a wide assortment of hooks capable of making contact with a cable so that the user can pull the cable to a desired position. In order to accomplish this, the platform from which the user stands must be in the direction to which the cable needs to be pulled. However, in some instances, the cable may need to be moved in a direction other than towards the platform.

While the prior known devices are therefore suitable for pulling cables, they do not typically allow a user to push or manipulate a cable in a forward direction without substantial difficulties. Accordingly, the need exists for a device capable of allowing a user to precisely position industrial material in a marine environment without the drawbacks described above.

Although there are a number of conventional boat hooks and the like that fulfill their respective objectives, the present invention, directed to a cable placement and retrieval device differs from the foregoing art in a number of aspects. The manner by which will become more apparent in the description which follows, particularly when read in conjunction with the accompanying drawings.

SUMMARY OF THE INVENTION

The present invention is directed to a cable placement and retrieval device for installing and positioning cables in a marine environment.

One embodiment of the present invention can include a main shaft forming a hook opening defined by a generally inverted U-shaped bend terminating at a spherical bead, a rigid push rod radiating up and away from the main shaft in the opposite direction of the hook opening and terminating in a second spherical bead and a hollow proximal portion for allowing the device to be connected to a pole.

Another embodiment of the present invention can include a cradle positioned between the main shaft and the push rod to prevent clipping and biting of ropes, cords, and cables by the device.

Yet another embodiment of the present invention can include a retainer arm that can act to further secure ropes, cables and cords being manipulated by the present invention.

A further embodiment of the present invention can include a flexible push rod that can be maneuvered to direct the hook in a multitude of directions and can act as a release for ropes and like object when being used in addition to the push rod cable retainer arm.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

Figure 1:
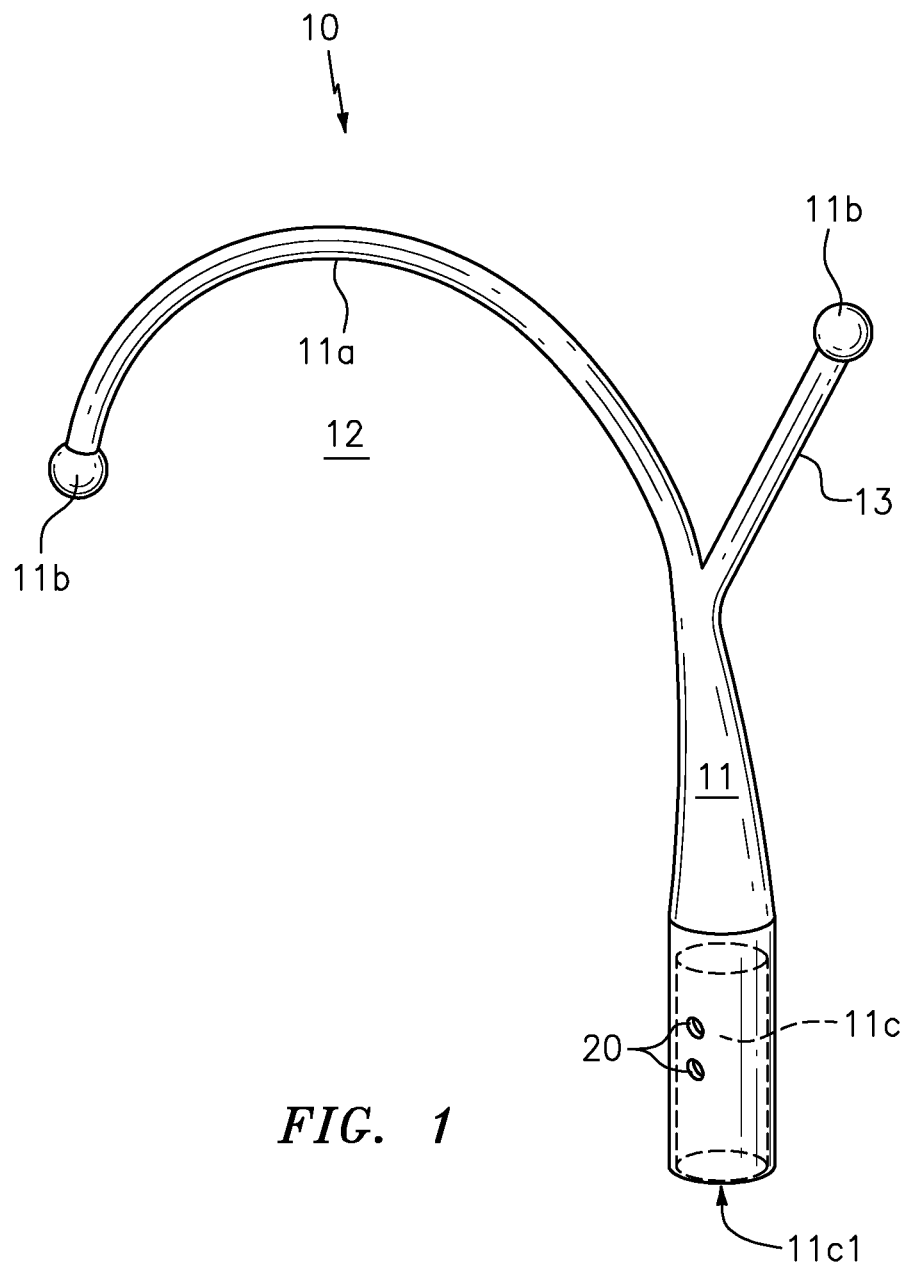
FIG. 1 is a frontal view of the cable placement and retrieval hook that is useful for understanding the inventive concepts disclosed herein.

For purposes of this description, the terms "upper," "bottom," "right," "left," "front," "vertical," "horizontal," and derivatives thereof shall relate to the invention as oriented in FIG. 1.

Although described throughout this document as a unit for positioning cables, one of skill in the art will recognize that the inventive concepts disclosed herein can be utilized with any number of different objects such as cables, bridge materials, nets, ropes, wires, and many others, for example.

FIG. 1 illustrates one embodiment of a cable placement and retrieval device that is useful for understanding the inventive concepts disclosed herein. The device 10 can include a main shaft 11 having a distal end and a proximal end. As shown, the device can form a hook opening 12 defined by a generally inverted U-shaped bend 11a near the distal end. Hook opening 12 can be utilized in a traditional manner to allow the device to engage cables and pull them towards the user.

In one embodiment, a spherical bead 11b can be positioned at the termination of the distal end for preventing the hook from snagging, penetrating or otherwise damaging cables while being positioned by the device.

The proximal end of the main shaft 11 will preferably include an open ended chamber 11c configured to receive an extension arm such as a telescoping pole, for example. To this end, the structure of the main shaft 11 will include a diameter sufficient to define the chamber 11c, and can further include threading on the internal side of the chamber 11c1 for allowing the device to connect to a pole having an opposing thread pattern, as is known in the art. Additionally, any number of connectors 20, such as pins, hooks, compression fittings and the like can also be included along the proximal end in order to ensure the device can be securely positioned to a pole or other such object.

In one preferred embodiment, the main body 11 can preferably be constructed from a hardened material such as steel or aluminum, each having excellent tensile strength and water resistant properties. However, other materials such as plastic, PVC, wood and/or composite materials, among others can also be utilized.

The device 10 can further include a generally planar push rod 13 positioned along the main body 11 at an orientation that is opposite to that of the bend 11a. In one preferred embodiment, the push rod can be positioned at an approximately 45 degree angle with respect to a vertical axis, where a vertical axis is defined as a straight line between the proximal end 11c and the bend 11a. Of course other orientations and angles are also contemplated.

As shown, the push rod 13 can also include a spherical bead 11b at the outermost end. The push rod can act to allow the device 10 to move objects, such as cables in directions away from the user, while remaining engaged with the cable.

Figure 2:
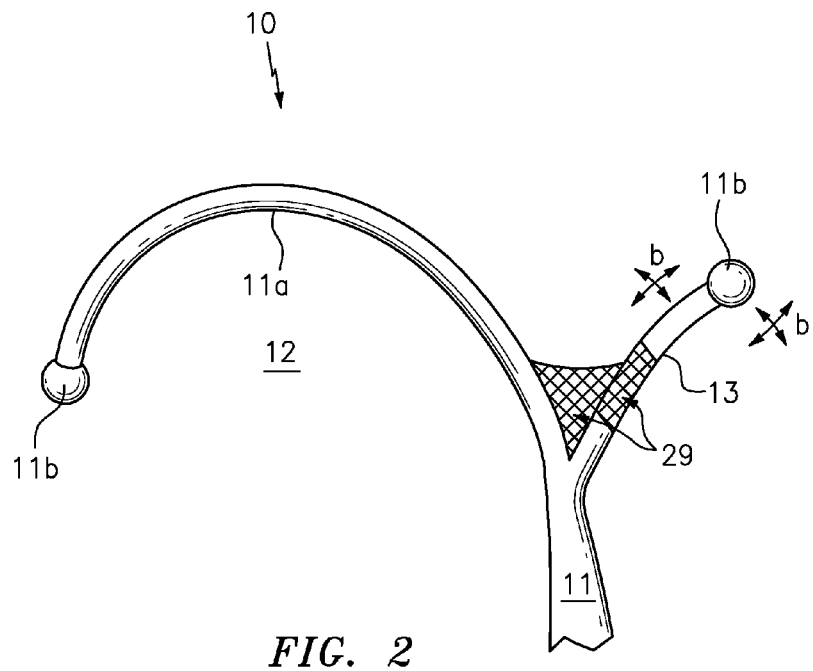
FIG. 2 is a magnified frontal view of additional embodiments of the invention.

FIG. 2 illustrates another embodiment of a cable placement and retrieval device 10 that further includes webbing 29 interposed between the main shaft 11 and the push rod 13. The webbing can act to form a cradle onto which a cable can be positioned in order to prevent the cable from becoming pinched between the shaft 11 and the rod 13. To this end, the webbing can act to allow the device 10 to provide increased maneuverability of cables without causing the cable to become stuck to, or pinched by the device. As described herein, the webbing can include a fixed shape constructed from plastic, metal and the like, or can include an adjustable (i.e. pliable) shape configured to mold to the shape of the cable. Non-limiting examples of pliable webbing materials can include rubber, soft plastic, wire mesh and other such materials which can be permanently secured to the device 10 in a conventional manner.

In one preferred embodiment, the push rod 13 can be constructed from a rigid material such as steel or aluminum, for example in order to withstand the stress and rigors of positioning large cables above or below the waterline. Alternatively, and as shown in FIG. 2, the push rod 13 can be constructed from a somewhat malleable material such as PVC, plastic and other such materials that are conventionally secured to the main body in order to allow the push rod to flex while in operation. In this manner, the push rod can be flexible enough to bend in a variety of directions (see arrow b) during operation, before returning to its original shape and location when pressure is not being applied.

Figure 3:
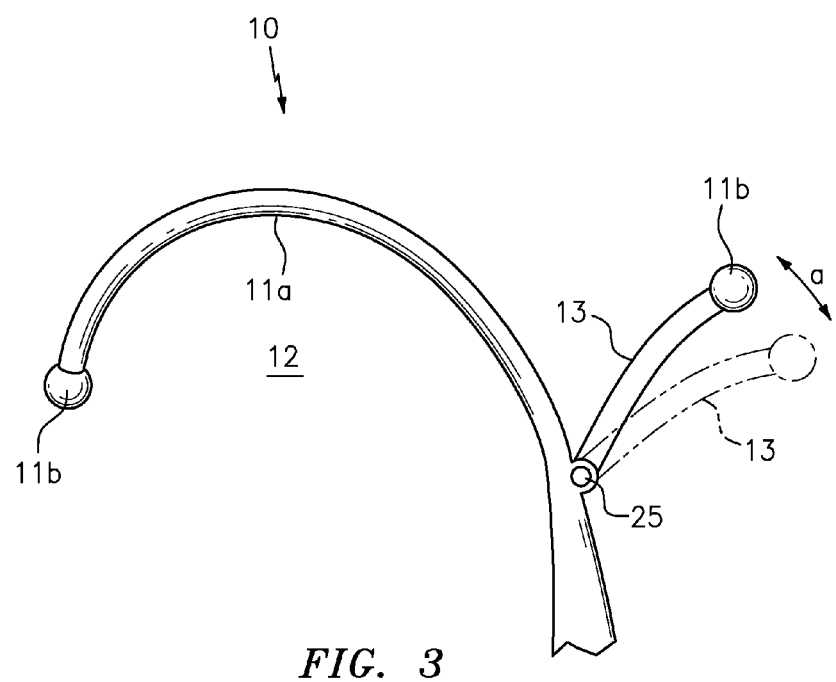
FIG. 3 is a magnified frontal view of an additional embodiment of the invention.

FIG. 3 illustrates an alternate embodiment of a cable placement and retrieval device 10 that further includes a tension hinge 25 interposed between the main body 11 and the push rod 13. The tension hinge 25 can be capable of allowing the rod to move (see arrow a) when the device is in operation. As described herein, a tension hinge can include any known object capable of connecting two objects together in a moveable manner when a desired pressure is exerted on one or both of the objects. In one embodiment, tension hinge can include a conventional spring loaded hinge, for example, however other devices are also contemplated.

Figure 4:
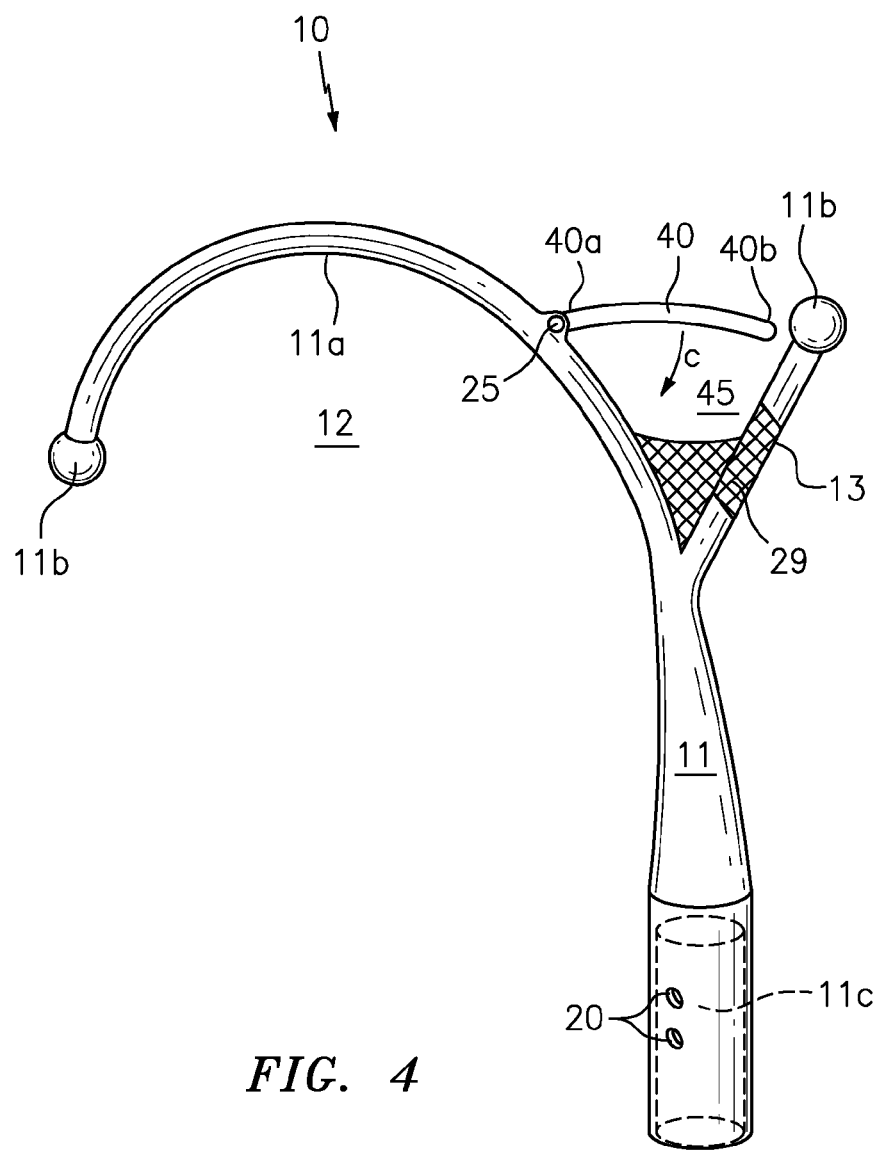
FIG. 4 is a frontal view of an additional embodiment of the invention in use.

FIG. 4 illustrates yet another embodiment of a cable placement and retrieval device 10 that further includes a retainer arm 40 that forms a pocket 45 into which a cable can be placed. As illustrated below, the pocket 45 will allow the device 10 to manipulate objects, such as cables in any direction (up, down, forward, backward) and at any angle.

As shown, one end of the retainer arm 40a can be connected to the main body via another tension hinge 25 and the second end of the arm 40b can be free. In one embodiment, the tension hinge 25 will act to allow the arm 40 to swing downward (see arrow c) into the opening 45 into which a cable can be placed.

Figure 5A:
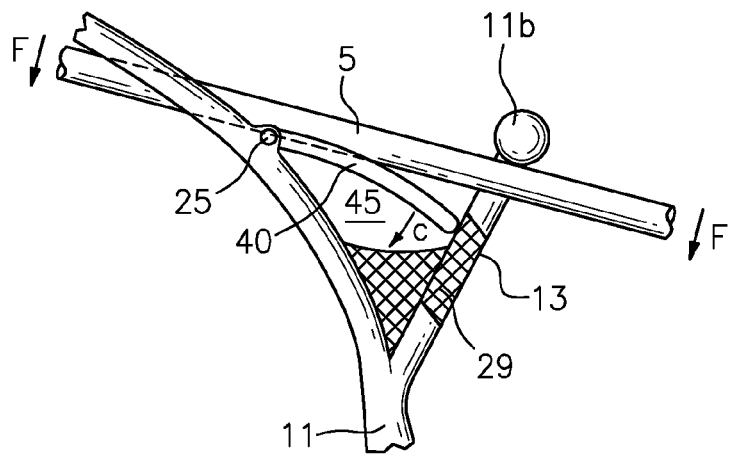
FIG. 5a is magnified frontal view of an additional embodiment of the invention in use.
Figure 5B:
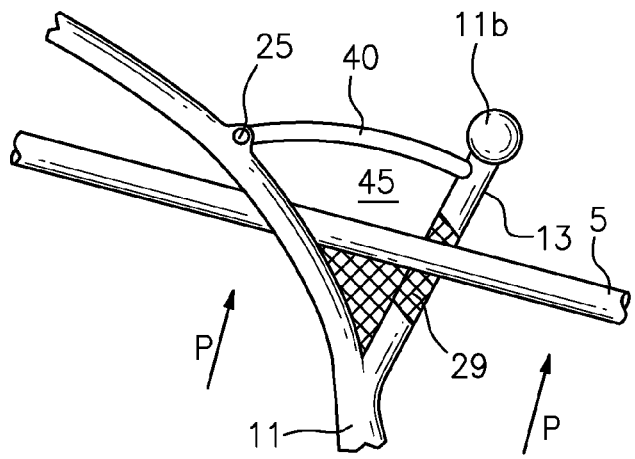
FIG. 5b is another magnified frontal view of an additional embodiment of the invention in use.
Figure 6:
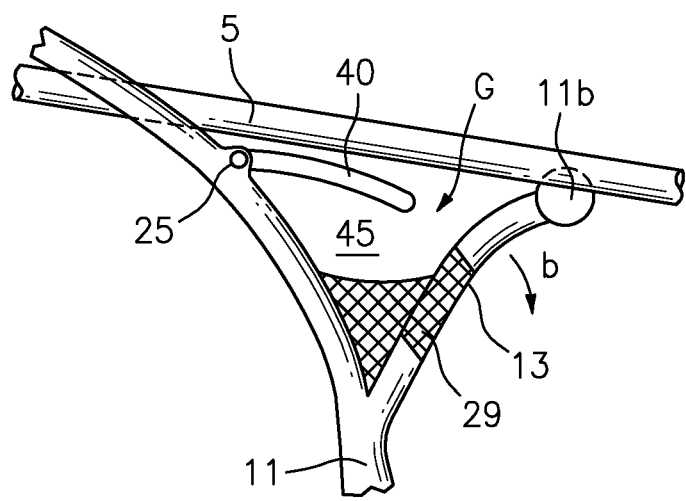
FIG. 6 is another magnified frontal view of an additional embodiment of the invention in use.

FIGS. 5a-6 illustrate one embodiment of the device 10 in operation for maneuvering a cable 5. To this end, a user can position the arm 40 against a cable 5 and apply sufficient force F to open the retainer arm 40, thereby allowing the cable to move into the opening 45 (FIG. 5a). When the cable 5 is positioned into the opening 45, and is therefore no longer applying pressure on the retainer arm 40, the tension hinge 25 will automatically pull the arm 40 up into the closed position and allow it to go no farther in the opposite direction than the retainer arm is in during rest (FIG. 5b). When in this position, the device can be utilized to maneuver the cable to a desired location, as described above.

As shown in FIG. 6, the cable can be disengaged from the device, and specifically the opening 45 by applying sufficient pressure/force onto the rod 13 which will bend downward (see arrow b as described above with respect to FIG. 2), thus creating a gap G between the push rod 13 and the retainer arm 40 through which the cable 5 can be removed.

Accordingly, a cable placement and retrieval device can allow a user to securely maneuver cables above and below the waterline in virtually any direction without causing damage to the cables, and without allowing the cables to slip off the device which can then be difficult to find when working under water.

As described herein, one or more elements of the cable placement and retrieval device 10 can be secured together utilizing any number of known attachment means such as, for example, screws, glue, compression fittings and welds, among others. Moreover, although the above embodiments have been described as including separate individual elements, the inventive concepts disclosed herein are not so limiting. To this end, one of skill in the art will recognize that one or more individual elements such as the main shaft 11, push rod 13, and/or retainer arm 40, for example, may be formed together as one continuous element, either through manufacturing processes, such as welding, casting, or molding, or through the use of a singular piece of material milled or machined with the aforementioned components forming identifiable sections thereof. Accordingly, in one embodiment, each above described element of the cable placement and retrieval device 10 can be constructed from a single piece of aluminum having a height and dimension suitable for use in a variety of applications. Of course other materials such as injection molded plastic, metals, and composite materials, among others, are also contemplated.

As to a further description of the manner and use of the present invention, the same should be apparent from the above description. Accordingly, no further discussion relating to the manner of usage and operation will be provided.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A cable placement and retrieval device, comprising:
    a single elongated main shaft having a first end, a second end, and a curved middle section, said shaft forming a generally inverted U-shaped hook;
    a cavernous opening disposed within the first end of the shaft, said opening being configured to receive a pole;
    a rigid, generally planar push rod having a first end secured to the main shaft at a location between the first end of the main shaft and the curved middle section, and a second end extending away from the main shaft in a generally opposite direction to the curved middle section, said push rod being configured to impart a pushing force upon a cable; and
    a pair of spherical beads secured to each of the second end of the main shaft and the second end of the push rod, respectively, said beads being configured to prevent damage to the cable,
    wherein the push rod extends away from the first end of the main shaft at an approximately 135 degree angle.

2. The cable placement and retrieval device of claim 1, further comprising:
    webbing that is interposed between an outside surface of the push rod and an outside surface of the main shaft, said webbing being configured to securely position the cable onto the device.

3. The cable placement and retrieval device of claim 2, wherein said webbing includes a fixed shape.

4. The cable placement and retrieval device of claim 2, wherein said webbing is constructed from a generally pliable material and is configured to contour to a shape of the cable.

5. The cable placement and retrieval device of claim 1, further comprising:
    a tension hinge interposed between the push rod and the main body, said hinge being configured to adjust the angle of the push rod.

6. The cable placement and retrieval device of claim 1, wherein the push rod is integrally formed with the main shaft.

7. The cable placement and retrieval device of claim 6, wherein the device is constructed from at least one of steel, aluminum, plastic, pvc, and composite materials.

8. The cable placement and retrieval device of claim 1, further comprising:
    at least one of a plurality of threads and connectors secured to the cavernous opening.

9. A cable placement and retrieval device, comprising:
    a single elongated main shaft having a first end, a second end, and a curved middle section, said shaft forming a generally inverted U-shaped hook;
    a cavernous opening disposed within the first end of the shaft, said opening being configured to receive a pole;
    a flexible, generally planar push rod having a first end secured to the main shaft at a location between the first end of the main shaft and the curved middle section, and a second end extending away from the main shaft in a generally opposite direction to the curved middle section, said push rod being configured to impart a pushing force upon a cable;
    a pair of spherical beads secured to each of the second end of the main shaft and the second end of the push rod, respectively, said beads being configured to prevent damage to the cable; and
    a pliable webbing that is interposed between an outside surface of the push rod and an outside surface of the main shaft, said webbing being configured to flex and bend in conformity with a movement of the push rod.

10. The cable placement and retrieval device of claim 9, further comprising:
    a tension hinge interposed between the push rod and the main body, said hinge being configured to adjust the angle of the push rod.

11. The cable placement and retrieval device of claim 9, wherein the push rod extends away from the first end of the main shaft at an approximately 135 degree angle.

12. A cable placement and retrieval device, comprising:
    a single elongated main shaft having a first end, a second end, and a curved middle section, said shaft forming a generally inverted U-shaped hook;
    a cavernous opening disposed within the first end of the shaft, said opening being configured to receive a pole;
    a flexible, generally planar push rod having a first end secured to the main shaft at a location between the first end of the main shaft and the curved middle section, and a second end extending away from the main shaft in a generally opposite direction to the curved middle section, said push rod being configured to impart a pushing force upon a cable; a pair of spherical beads secured to each of the second end of the main shaft and the second end of the push rod, respectively, said beads being configured to prevent damage to the cable;
    a first tension hinge interposed between the push rod and the main body, said hinge being configured to adjust the direction of the push rod;
    a pliable webbing that is interposed between an outside surface of the push rod and an outside surface of the main shaft, said webbing being configured to flex and bend in conformity with a movement of the push rod;
    a generally planar retainer arm having one end secured to the main shaft at a location between the first tension hinge and the second end of the main body, said retainer arm extending away from the main shaft at a second direction that is generally parallel to the push rod; and
    a second tension hinge interposed between the retention rod and the main body, said second hinge being configured to bend the retention rod towards the push rod.

13. The cable placement and retrieval device of claim 12, wherein the main shaft is constructed from at least one of steel, aluminum, plastic, pvc, and composite materials.

14. The cable placement and retrieval device of claim 12, wherein the push rod extends away from the first end of the main shaft at an approximately 135 degree angle.

* * * * *